Dec. 11, 1956 C. F. WEBB 2,773,647
GRAND TOTAL ACCUMULATING MECHANISM
Filed Dec. 22, 1951 2 Sheets-Sheet 1
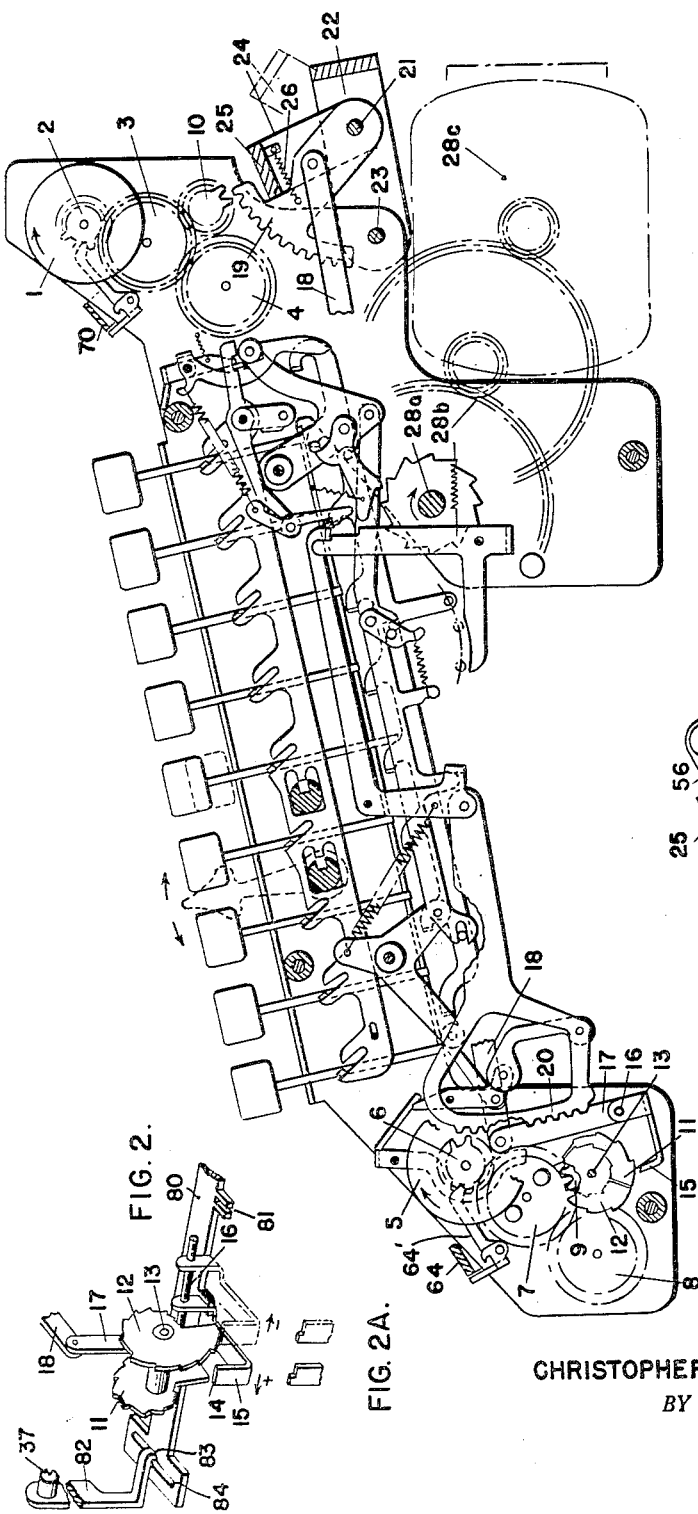
INVENTOR.
CHRISTOPHER FREDERICK WEBB
BY
ATTORNEYS Dec. 11, 1956 C. F. WEBB 2,773,647
GRAND TOTAL ACCUMULATING MECHANISM
Filed Dec. 22, 1951 2 Sheets-Sheet 2

INVENTOR.
CHRISTOPHER FREDERICK WEBB
BY
ATTORNEYS

United States Patent Office 2,773,647
Patented Dec. 11, 1956

2,773,647

GRAND TOTAL ACCUMULATING MECHANISM

Christopher Frederick Webb, London, England, assignor to Bell Punch Company Limited, London, England, a British company Application December 22, 1951, Serial No. 262,953

Claims priority, application Great Britain January 30, 1951

1 Claim. (Cl. 235—82)

This invention is for improvements in or relating to calculating machines and has for at least one of its objects the provision of a grand total register to which, or from which, sub-totals accumulated upon a primary register of numerals may be added or subtracted. The position of the grand total register is at the rear of the machine when viewed from the position of the operator, and the present invention concerns the mechanism whereby a sub-total on a primary register located at the front of the machine can be transferred to the grand total register at the rear of the machine either for the purpose of addition or subtraction.

Further, the present invention concerns means whereby a sub-total on the primary register or a grand total on the grand total register or both, may be cancelled by means of a simple operation.

According to the present invention, there is provided a calculating machine wherein each order of the machine comprises in combination at least one cam operatively connected to the numeral wheel of the primary register, transfer mechanism normally out of engagement with said cam and means operable to bring the cam and the transfer mechanism into operative engagement to permit a numeral relative to the numeral displayed by the primary register to be added to the numeral indicated upon a grand total register. The numeral which is "added" to the numeral of grand total register depends upon whether an addition or subtraction of the sub-total on the primary register is to be effected on the grand total register.

Further, according to the present invention there is provided a calculating machine wherein each order of the machine comprises in combination a primary register, a grand total register and transfer mechanism operable to transfer a numeral relative to a numeral displayed upon the primary register to the grand total register the said transfer mechanism including a rack which is only brought into engagement with the pinion of the numeral wheel of the grand total register after the transfer mechanism has set the said rack to a position corresponding to the relative numeral to be transferred.

The invention will be more particularly described with reference to the accompanying drawings in which:

Figure 1 illustrates in side elevation one order of a calculating machine constructed in accordance with the present invention.

Figure 2 illustrates in perspective the transfer cams shown in side elevation in Figure 1.

Figure 2A is a fragmentary view of the toe of the lever or follower in the lowest orders only which co-operates with the said transfer cams.

Figure 4 illustrates in two positions the stirrup operating lever of Figure 3.

Figure 3:
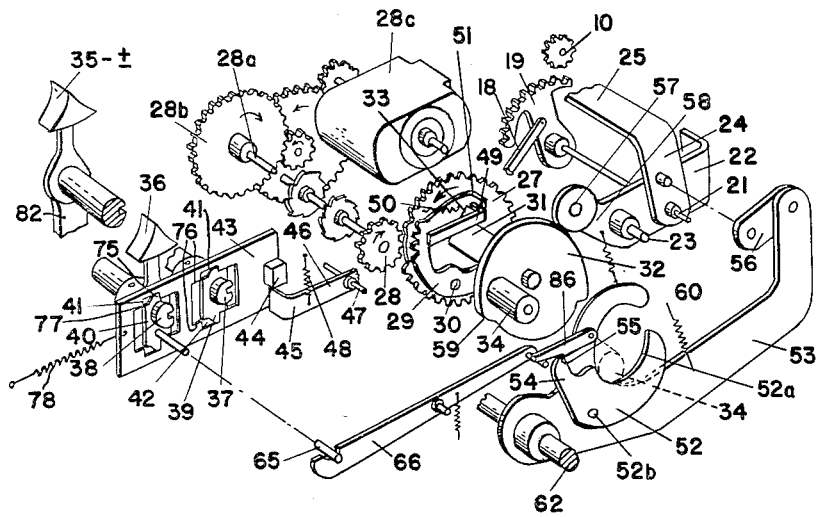
Figure 3 illustrates the means employed for causing the cam lever to move into engagement with the selected cam and for thereafter effecting the movement of the corresponding quadrant rack associated with the grand total register into mesh with the pinion of the corresponding numeral wheel.

Referring to the drawings the present invention will be hereinafter described with reference to the calculating machine embodying the principles set forth in my copending patent application Serial No. 262,952, filed December 22, 1951, although it will be readily appreciated that the subject matter of the present invention is not limited to a machine of such a construction. There is mounted at the rear of a machine of the above character, when viewed from the position of an operator, a grand total register comprising inter alia for each order a second numeral wheel 1 and a second pinion 2, the second pinion 2 being arranged in train with two further gears 3 and 4. The second numeral wheel 1, second pinion 2 and the train of gears 3 and 4 are similar to the corresponding first numeral wheel 5, first pinion 6 and first train of gears 7 and 8 of the primary register described in the above mentioned application.

Meshing with the gears which engage with the pinions of the primary and grand total registers are two transfer pinions 9 and 10, which reproduce exactly the angular movements of their respective numeral wheels. Rigidly associated with the transfer pinion 9 of the primary register are two identical snail cams 11 and 12 (Figures 1 and 2) assembled in reverse relationship and spaced apart from one another along the spindle 13 of the transfer pinion 9. Arranged for selective peripheral contact with either one or the other of the two cams 11 and 12 is the toe 14 of a cam lever 15 adapted to be swung about the axis of a spindle 16 so that a substantially radial movement of the toe 14 provides differential angular positions of the cam lever 15 for each digit position of the numeral wheel 5 of the primary register. The cam lever 15 is arranged for both angular and axial movement on the spindle 16. The angular movement is independent for each order of the machine, but the axial location in either one of two positions is collective for all orders. Normally the toes 14 of all the levers are positioned in operative relation to the positive or additive snail cams 11 as shown in Figure 2, but when conditioned for negative or complemental addition as described later, a transverse bar 80 having slots 81 for locating all the levers is moved, and axially displaces all the levers to the position shown dotted, thus permitting operative relation of the toes 14 to the negative or subtractive snail cams 12.

One limb 17 of the lever 15 is extended upwardly and connected at the top to one end of a substantially horizontal link 18 which extends from the primary register to the grand total register at the rear of the machine. The rear end of the said horizontal link 18 is pivotally connected to a rack 19 pivoted at 21 in such a manner that any radial movement of the toe 14 produces a relative circumferential movement of the quadrant rack 19.

In Figure 1 the lever 15 is presumed in position to engage the positive cam 11, whereby no appreciable radial movement of the toe can occur with the numeral wheel registering 0 and therefore no appreciable movement of the substantially horizontal link 18. Likewise each digital change of numeral wheel 5 gives equivalent positive increase to the permitted movement of rack 19 by cam 11.

For subtraction, by the well known negative process of complemental addition, it will be seen in Figure 1 that if toe 14 is axially displaced to coact with cam 12, with the numeral wheel still at 0, the toe 14 permits rack 19 to move a distance of 9 teeth, and similarly all other positions of cam 12 will, in decimal orders of the machine, add the complement of the numeral figures with respect to 9. In a pence order having 12 numeral figures, and 12 positions on cams 11 and 12 as shown in Figure 2 the complement of the numeral figures will be with respect to 11.

The above process, in conjunction with normal transfer process between adjacent orders, gives the correct addition of positive or negative quantities from the subtotal register to the total register except for the units order of the machine, wherein the complement for subtraction must be with respect to 10, if decimal, or with respect to 12, if pence. For this purpose the toe of lever 15, in the units order only of the machine, is provided with a step as indicated in the fragmentary view of the toe 15 of the lever 17 illustrated in Figure 2A, whereby the upper step would engage the positive cam 11 during addition and the lower step would engage cam 12 during subtraction. The depth of this step is equivalent to one digit of movement and thus permits displacement of rack 19 in the lowest or units order of the machine to be one tooth more during subtraction than would be the case in other orders.

The rack 19 is operable to engage and disengage with the transfer pinion 10 of the grand total register in a manner similar to the way in which the rack 20 of the primary register engages with the first pinion 6 of the first numeral wheel 5 of the primary register. The rack 19 of the grand total register is mounted upon the pivot rod 21 which is carried between the limbs of an upwardly displaceable stirrup 22 pivotally mounted at 23 to the frame of the machine (Figures 1 and 4), whereby a small upward movement can be simultaneously effected to the racks in all orders of the grand total register to place the racks 19 into mesh with all the transfer pinions 10 of the grand total register in a manner hereinafter more particularly described. Also freely mounted on said pivot rod 21 is a rack operating stirrup 24 including a transverse bar 25. All of the racks 19 are normally urged to bear against the bar 25 by springs 26 extending between each rack 19 and the bar 25. The stirrup 24 is normally positioned, as will be hereinafter described, so that the springs 26 normally maintain, through the medium of the substantially horizontal links 18 hereinbefore referred to, the toes 14 of all the cam levers 15 in such a position that they are clear of the snail cams hereinbefore referred to as they rotate during the normal operation of the primary register.

The means by which the upwardly displaceable stirrup 22 and the rack operating stirrup 24 are moved to effect the movement of the toe 14 of the cam lever into engagement with the selected cam and thereafter to transfer a numeral relative to that displayed by the primary register to the grand total register, or alternatively to cancel the numerals displayed thereon is effected by a mutilated gear-cam assembly which comprises a mutilated gear wheel 27 adapted to be rotated by a pinion 28 mounted on the end of a shaft 28a which carries the power wheel 28b (Figure 1 and 3), will now be described. A radially displaceable gear segment 29 pivotally mounted at 30 on the face of the mutilated gear wheel 27 constitutes a known type of intermittent drive through which one complete revolution can be imparted to the mutilated gear wheel 27 as required and as has been described in the Helsel Patent No. 2,309,191, dated January 26, 1943. The mutilated gear wheel 27 is secured to a bearing sleeve 31 which carries a stirrup operating cam 32, the whole mutilated gear-cam assembly being arranged to be rotatable on a stud fixed in the frame of the machine. The bearing sleeve 31 carrying the mutilated gear wheel 27 is provided with a toothed projection 33 adapted to control the operation of the gear segment 29, and mounted on the face of the stirrup operating cam 32 is a roller 34, the function of which will be hereinafter described.

Mounted to one side of the machine, or preferably one on each side, are two control handles 35 and 36 which are fixed respectively to slotted rods 37 and 38 extending through the machine. Mounted upon the slotted rods 37 and 38 are a pair of control plates 39 and 40 which are arranged to engage in slots 41 and 42 provided in cutouts in a slide plate 43 which is mounted adjacent to the right-hand frame plate of the machine. If either of the slotted rods 37 or 38 is rotated in a clockwise or anticlockwise direction it will displace the slide plate 43 rearwardly relatively to the position of the operator until a square stud 44 on the slide plate 43 moves beyond the bent forward end 45 of a clutch lever 46. The clutch lever 46 is pivoted at a point 47 along its length and is normally spring-loaded at 48 so as to bear against the underside of the square stud 44. When the slide plate 43 is displaced rearwardly the forward end 45 of the clutch lever 46 (as viewed by the operator) is free to rise, whilst the rearward end 49 (which is also bent) moves downwardly to release a tail 51 on the gear segment 29 and permit the gear segment 29 to be drawn forwardly by a spring 50 into mesh with the rotating pinion 28 fixed to the power drive shaft 28a. The drive shaft 28a may be driven by a motor 28c which may be either continuously or intermittently operated. During the resulting rotation of the gear segment 29 the gear 27 and the cam 32, the slide plate 43 is locked in its rearward position by the square stud 44 being located in front of the bent forward end 45 of the clutch lever 46. The contour of the control plates is such that whichever of the slotted rods has been rotated, no matter in which direction, further rotation of either of the control plates in either direction is prevented. For example, if the slotted rod 38 is rotated in a clockwise direction, as viewed in Figure 3, the upwardly extending lug 75 of the control plate 40 will displace the slide plate 43 to the right as viewed in Figure 3. The upper and lower edges 76 of the cutout associated with the control plate 39 will engage the left hand upper and lower edges of the control plate 39 and prevent its rotation while the slide plate is in this position. The corner 77 of the control plate 40 will engage the left end of the slot 41 in its associated cutout and will thereby be prevented from rotating in a counterclockwise direction. Regardless of which direction either of the slotted rods are rotated, a similar condition will exist among the control plates serving to lock both slotted rods against further rotation in either direction until the slide plate 43 has been returned to the position shown in Figure 3 by the action of the spring 78. The release of the slide plate 43 is effected towards the end of one revolution of the mutilated gear wheel 27, when the sloping face of the toothed projection 33 on the bearing sleeve 31 raises the rearward end 49 of the clutch lever 46 which then intercepts the advancing tail 51 of the gear segment 29. Rotation of the gear assembly continues however until the teeth of the gear segment 29 are fully withdrawn out of line with the remaining teeth of the mutilated gear wheel 27, which breaks the drive. When the clutch lever 46 is moved by the toothed projection 33 of the mutilated gear wheel 27, it is moved a distance slightly more than is necessary to release the square stud 44 on the slide plate 43, and coincident with the release of the gear segment 29 the rear end 51 of the clutch lever 46 falls a small distance behind the toothed projection 33, whereby the mutilated gear cam assembly is held against rotation in either direction and the clutch lever is again bearing against the underside of the square stud 44 for further operation.

As a result of the above operation, the cam 32 receives one complete revolution, and depending upon which of the control handles has been operated and in which direction so either (*a*) a sub-total is added to the grand total register and the sub-total cancelled from the primary register, or (*b*) a sub-total is subtracted from the grand total register and the sub-total cancelled, or (*c*) a cancellation of the sub-total from the primary register alone is effected, or (*d*) a complete cancellation of both the sub-total and the grand total is effected from both the primary and grand total registers.

Movement of either handle 35 or handle 36 to initiate any of the above processes will obstruct the operation of all digit keys and primary registering mechanism, through the interlocking medium of the slotted rods 37 or 38 with the keys of all orders of the machine, as indicated in Figure 1. This ensures that no further digital addition can be made to the sub-total figures or snail cams while the transfer or cancelling operations are in process.

Figure 5:
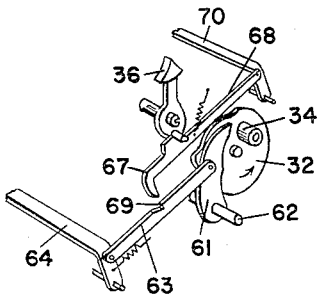
Figure 5 illustrates means by which both the primary and grand total registers are returned to zero.

For the addition or subtraction of the sub-total to or from the grand total register, the control handle 35 (hereinafter referred to as the adding control handle) is moved for example towards the operator to add a sub-total, and away from the operator to subtract a sub-total. In the latter case the movement of the handle 35 moves a member 82 affixed to rod 37 and having a portion 83 extending through a slot 84 in the before-mentioned slotted bar 80. Movement of the handle 35 displaces axially all the cam levers 15 to the subtracting position. When the handle is moved in either clockwise or anti-clockwise direction, the resulting movement of the slide plate and the clutch lever releases the gear segment, whereby the mutilated gear wheel 27 and the cam 32 commence to rotate in an anti-clockwise direction. The roller 34 carried on the face of the cam 32 engages with the surface 52a of a cam 52 pivotally mounted at 52b on an operating lever 53. The forward end 54 of the cam 52 normally abuts against a stop 55 on a pawl 86, also pivoted on the lever 53, whereby both the cam 52 and the pawl 86 normally move with the lever 53 but remain relatively stationary thereto. As the cam 32 rotates the roller 34 carried on the face of the cam 32 depresses the lever 53 (during the first one-third of its cycle) until the free end of the lever 53 reaches a point where the rack operating stirrup 24 (Figure 4) has been moved rearwardly through the medium of a short link 56 pivotally connected to the end of the lever 53 and the said rack operating stirrup 24. Owing to the movement of the rack operating stirrup 24 and the consequent tension placed on the springs 26 the racks 19 (Figure 1) have completed the rearward movement permitted by the position of the snail cam 11 or 12. At this point a roller 57 (Figure 3), mounted on a forward extension 58 of the upwardly displaceable stirrup 22, which has been held in spring contact with the periphery of the cam 32 drops into a depression 59 in the cam 32 and allows the pivot rod 21 carrying all the racks 19 of the grand total register to rise and engage the corresponding second pinions 10 of the grand total register. Immediately following this, the roller 34 mounted on the face of the cam 32 commences to lift an extension 60 of the stirrup operating lever 53, and so imparts a forward movement to the rack operating stirrup 24 which moves the racks 19 forwardly to effect registration of the selected amounts. Thereafter, at approximately the second one-third of the cycle, the roller 57 mounted upon the forward extension 58 of the upwardly displaceable stirrup 22 is lifted to withdraw the racks and at the same time the roller 34 mounted upon the face of the cam 32 engages a trip lever 61 (Figure 5) mounted adjacent to the lever 53 and also pivoted about the same axis 62 as the lever 53 which during the last one-third of the cycle of the cam 32 pushes forward a link 63 to displace a cancel stirrup 64 and lift pawls 64' from the pinions 6 of the numeral wheel 5 to effect zeroising of the primary register as is described in greater detail in the Webb Patent No. 2,291,853.

When cancellation alone is required, this is effected by the control handle 36 hereinafter referred to as the cancelling handle, which if pulled towards the operator will effect the operation of the mutilated gear-cam assembly whereby the operation of the cam 32 will proceed as hereinbefore described, but the swinging of the rack operating stirrup 24 will not occur owing to the action of a release stud 65 on the control plate 40 of the cancelling handle 36 tipping a pivoted lever 66, the rear end of which raises the pawl 86 mounted on the lever 53 whereby the roller 34 mounted on the face of the stirrup operating cam 32 will be able to rock the cam lever 52 pivoted on the lever 53 without imparting any movement thereto, and during the last portion of the cycle, the trip lever 61 will be moved to zeroise the primary register only.

If, however, the cancelling handle 36 is moved away from the operator, the same functions in general occur, but with the addition that the release stud 65 on the forward end of the control plate 40 of the cancelling handle 38 also depresses the forward end 67 of a hooked link 68 (Figure 5) whereby the hook 67 is positioned in a notch 69 cut in the link 63 connecting the trip lever 61 to the forward cancel stirrup 64 and as the hooked link 68 is also connected to the rearward cancel stirrup 70, both stirrups are operated together to cancel both the primary and the grand total registers.

What is claimed is:

In a calculating machine including a plurality of orders, a primary register including a numeral wheel for each of said orders, a pair of rotatable cams operatively connected to the numeral wheel of each order of the primary register for providing complemental displacements as the numeral wheel is rotated, a grand total register including a numeral wheel for each of said orders, and transfer mechanisms extending between corresponding orders of said primary and grand total registers, said transfer mechanisms each including a cam follower, means for selectively positioning said cam follower adjacent to one or the other of the cams of its order, said cam follower being normally out of engagement with its adjacent cam, means for bringing said cam follower into engagement with its adjacent cam thereby selectively displacing said follower directly for addition or complementally for subtraction relative to the position of the primary register numeral wheel depending upon which of the cams is engaged by the follower, and means responsive to the position of said follower for transferring to the grand total register numeral wheel a numeral relative to the numeral displayed by the primary register numeral wheel, the cam follower of the lowest order being provided with a stepped cam engaging surface to provide an extra digit during the process of subtraction.

References Cited in the file of this patent
UNITED STATES PATENTS

| | | |
|---|---|---|
| 1,255,568 | Peters | Feb. 5, 1918 |
| 1,692,411 | Kassner | Nov. 20, 1928 |
| 1,783,943 | Kassner | Dec. 2, 1930 |
| 2,240,797 | Pasinski | May 6, 1941 |
| 2,240,798 | Pasinski | May 6, 1941 |
| 2,356,714 | Webb | Aug. 22, 1944 |